US012792542B2

(12) United States Patent
Nenna

(10) Patent No.: US 12,792,542 B2
(45) Date of Patent: Nov. 10, 2026

(54) METHOD FOR AUTOMATICALLY ASSIGNING IDENTIFIERS TO CONTROLLED NODES OF A FIELDBUS NETWORK

(71) Applicant: Danfoss Power Electronics A/S, Gråsten (DK)

(72) Inventor: Carlo Nenna, Bergamo (IT)

(73) Assignee: DANFOSS POWER ELECTRONICS A/S, Gråsten (DK)

( * ) Notice: Subject to any disclaimer, the term of this patent is extended or adjusted under 35 U.S.C. 154(b) by 114 days.

(21) Appl. No.: 18/904,463

(22) Filed: Oct. 2, 2024

(65) Prior Publication Data

US 2025/0117348 A1 Apr. 10, 2025

(30) Foreign Application Priority Data

Oct. 5, 2023 (DE) ......................... 102023127212.8

(51) Int. Cl.
*G06F 13/20* (2006.01)
*G06F 13/36* (2006.01)

(52) U.S. Cl.
CPC .......... *G06F 13/36* (2013.01); *G06F 2213/40* (2013.01)

(58) Field of Classification Search
None
See application file for complete search history.

(56) References Cited

U.S. PATENT DOCUMENTS 6,035,364 A * 3/2000 Lambrecht .............. G06F 13/36 375/E7.02
6,128,688 A * 10/2000 Kondo ................ G06F 13/4027 710/306
6,807,593 B1 * 10/2004 Moss ...................... G06F 13/36 710/110

(Continued)

FOREIGN PATENT DOCUMENTS

DE 102005057523 A1 6/2007
DE 102020216278 A1 6/2022

OTHER PUBLICATIONS

Foundation Fieldbus Device addressing, Jul. 14, 2019, Industrial Automation Support (Year: 2019).*

(Continued)

*Primary Examiner* — Hyun Nam
(74) *Attorney, Agent, or Firm* — McCormick, Paulding & Huber PLLC

(57) ABSTRACT

A method for automatically assigning identifiers to controlled nodes of a fieldbus network, the controlled nodes comprising a plurality of electric motor drive systems, IO devices and/or feedback sensors, wherein the method includes the steps of setting the fieldbus network into a service mode; scanning the fieldbus network; decomposing the fieldbus network into linear branches and switches; scanning each linear branch; and assigning unique identifiers to the controlled nodes of the fieldbus network, wherein the identifiers include the relative positions of the controlled nodes in the fieldbus network and a node number. The disclosure is further directed at a fieldbus network including a plurality of controlled nodes, preferably electric motor drive systems, wherein the fieldbus network is provided for performing the method for automatically assigning identifiers.

20 Claims, 16 Drawing Sheets

(56) References Cited

U.S. PATENT DOCUMENTS

| | | | | |
|---|---|---|---|---|
| 9,703,740 | B2 * | 7/2017 | Gardiner | G06F 13/16 |
| 11,435,712 | B2 * | 9/2022 | Pöschmann | G05B 19/0423 |
| 2006/0077917 | A1 * | 4/2006 | Brahmajosyula | H04L 12/66<br>370/310 |
| 2007/0073912 | A1 * | 3/2007 | Ozaki | G05B 19/054<br>710/8 |
| 2009/0319062 | A1 * | 12/2009 | Schwalbe | G05B 19/4185<br>700/86 |
| 2019/0258596 | A1 * | 8/2019 | Sotriffer | G05B 19/056 |
| 2024/0297808 | A1 | 9/2024 | Zinner et al. | |

OTHER PUBLICATIONS

VLT Decentral FCD 300 Design Guide, Nov. 20, 2008, Danfoss (Year: 2008).*

Krah el al., "Lean Safe Drive Architecture with Fully Integrated Multi-Axis Safety Functions due to an Extremely Fast Safety-related Fieldbus Interface", May 2021, PCIM (Year: 2021).*

* cited by examiner

* Ascending *order*. For Descending *order* the test condition is replaced by: ‘$n \geq 1$’

** Ascending *order*. For Descending *order* the equation is replaced by: ‘$n = n - 1$’

Fig. 11a Decentral line ID assignment through DAM with MAC 00:1b:08:xx:xx:xx
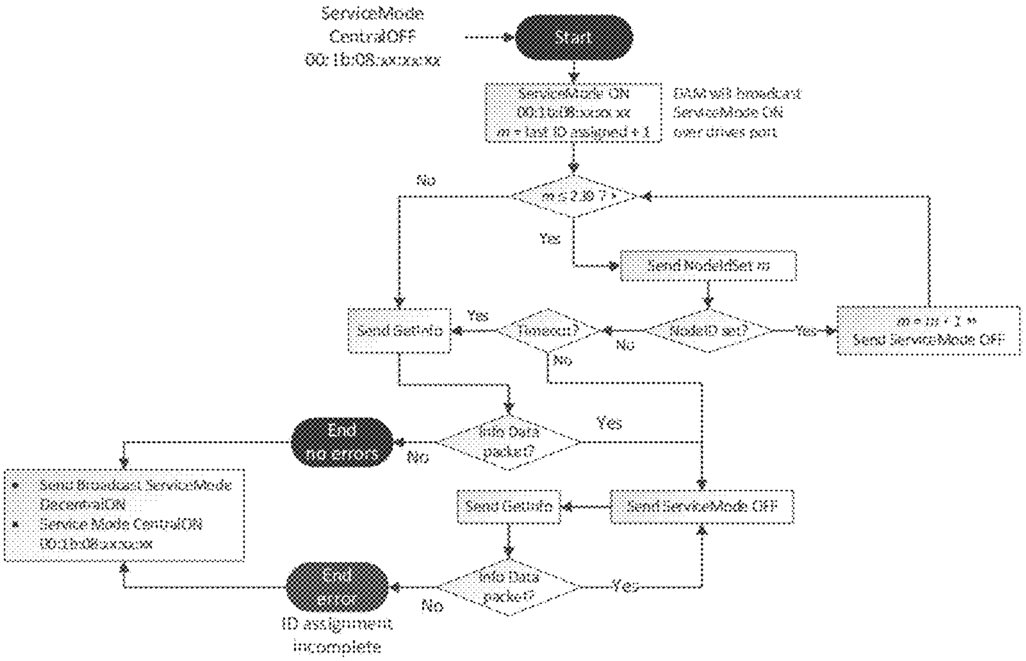
* Ascending *order*. For Descending *order* the test condition is replaced by: '$m \geq 1$'
** Ascending *order*. For Descending *order* the equation is replaced by: '$m = m - 1$'
Fig. 11b **Automatic ID Assignment using PSM with ID *x*, triggered via LCP**
***Start Node ID* selected by user. *x* < *Start Node ID* ≤ 239**
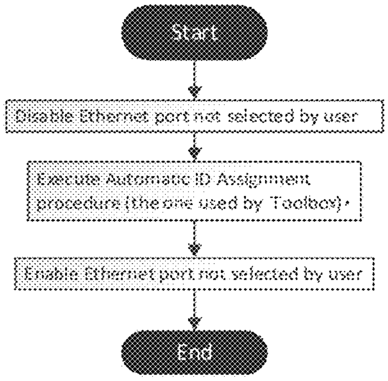

* Ascending order. For Descending order the test condition is replaced by: 'n ≥ 1'

** Ascending order. For Descending order the equation is replaced by: 'n = n -1'

* Ascending order. For Descending order the test condition is replaced by: 'n ≥ 1'

** Ascending order. For Descending order the equation is replaced by: 'n = n -1'

METHOD FOR AUTOMATICALLY ASSIGNING IDENTIFIERS TO CONTROLLED NODES OF A FIELDBUS NETWORK

CROSS-REFERENCE TO RELATED APPLICATION

This application claims foreign priority benefits under 35 U.S.C. § 119 to German Patent Application No. 102023127212.8 filed Oct. 5, 2023, the content of which is hereby incorporated by reference in its entirety.

TECHNICAL FIELD

The present invention is directed at a method for automatically assigning identifiers to controlled nodes of a fieldbus network.

The present invention is also directed at a fieldbus network comprising a plurality of controlled nodes, preferably electric motor drive systems, wherein the fieldbus network is provided for performing the method for automatically assigning identifiers.

BACKGROUND

The setting up of fieldbus networks, such as e.g. an Ethernet powerlink fieldbus, requires the assignment of identifiers to the fieldbus components. This typically requires a number of manual assignment steps, which are performed by an operator.

A problem arising from this procedure is that errors can easily be introduced by an operator during the assignment process.

SUMMARY

The aim of the present invention is to improve the setting up of fieldbus networks by reducing the number of errors that can occur during the setting up. This aim is achieved by a method according to claim 1 and a fieldbus network according to claim 10. Preferable embodiments of the invention are subject to the dependent claims.

According to claim 1, a method for automatically assigning identifiers to controlled nodes of a fieldbus network is provided. The controlled nodes comprise a plurality of electric motor drive systems, IO devices and/or feedback sensors. The method comprises the steps of

- setting the fieldbus network into a service mode;
- scanning the fieldbus network;
- decomposing the fieldbus network into linear branches and switches;
- scanning each linear branch; and
- assigning unique identifiers to the controlled nodes of the fieldbus network, wherein the identifiers comprise the relative positions of the controlled nodes in the fieldbus network and a node number.

The scanning of the field bus network and assigning of identifiers may be performed fully or nearly fully automatically, thereby reducing the risk of manual errors.

In a preferred embodiment of the invention, at least one of the steps is performed automatically and/or a step of the method comprises manually setting the identifier of a specific controlled node selected through a positional index.

In this embodiment, a specific controlled node may be set manually to a desired identifier, providing flexibility in the setting up of the fieldbus network.

Positional index and node number are two different entities. Each node on a fieldbus network may have a positional index and a node number (or ID). For example, in the configuration "PLC-CN1-CN2-CN3" CN2 is the 2nd node (positional index 2), but it may have any ID or node number. For example, it may be decided to assign IDs in ascending order starting from value 100. So for the above configuration the positional indices and IDs may become: PLC-CN1 (ID 100)-CN2 (ID 101)-CN3 (ID102).

In another preferred embodiment of the invention, at least some of the steps are performed by a software application running on a computer connected to the fieldbus network, wherein preferably some or all controlled nodes are assigned a unique identifier as an incremental or decremental value starting from a selected node number.

The computer may be an integrated component of the fieldbus network or it may be an external device, such as a portable computer, a tablet or a smartphone, which is connectable to the fieldbus network.

In another preferred embodiment of the invention, at least some of the steps are performed by at least one power supply module (PSM) and/or at least one decentral access module (DAM) triggered by a local control panel (LCP), wherein preferably some or all controlled nodes are as-signed a unique identifier as an incremental or decremental value starting from a selected node number.

In another preferred embodiment of the invention, at least some of the steps are performed by a decentral access module (DAM) triggered by a programmable logic controller (PLC), wherein preferably some or all controlled nodes are assigned a unique identifier as an incremental or decremental value starting from a selected node number and wherein the assigned controlled nodes are connected to the same hybrid cable of the decentral access module (DAM).

In another preferred embodiment of the invention, setting the fieldbus network into a service mode comprises setting into service mode at least some or preferably all of the controlled nodes automatically.

In another preferred embodiment of the invention, the controlled nodes comprise at least one multiaxis servo drive system (MSD), preferably one or more integrated servo drive (ISD) and/or decentral servo drive (DSD), and/or the fieldbus network is an Ethernet powerlink fieldbus.

In another preferred embodiment of the invention, the multiaxis servo drive system (MSD) comprises the power supply module (PSM) together with the decentral access module (DAM), and/or one or more auxiliary capacitor module (ACM) and/or one or more servo drive module (SDM).

In another preferred embodiment of the invention, a controlled node is set to operational mode after being assigned its unique identifier.

The network and/or all its controlled nodes may be set into the service mode automatically at the beginning of the process. Once a controlled node is assigned a unique identifier, the node may then be requested to quit the service mode, i.e. set to operational mode. Once all nodes have been assigned their identifiers, a broadcast "Service Mode OFF" command may be sent to them to make sure that the full network is back to nominal operational conditions. The operation of the network may commence immediately with no need of any manual steps such as resetting or power-cycling the entire network to quit service mode. All these steps may be performed automatically.

The inventions is also directed at a fieldbus network comprising a plurality of controlled nodes, preferably electric motor drive systems, wherein the fieldbus network is provided for performing the method according to any of claims 1 to 9.

BRIEF DESCRIPTION OF THE DRAWINGS

Further details and advantages of the invention are described with reference to the embodiments shown in the figures. The figures show:

FIG. 11*a*: ID assignment procedures for decentral lines;

FIG. 11*b*: automatic ID assignment using PSM;

DETAILED DESCRIPTION

Figure 1:
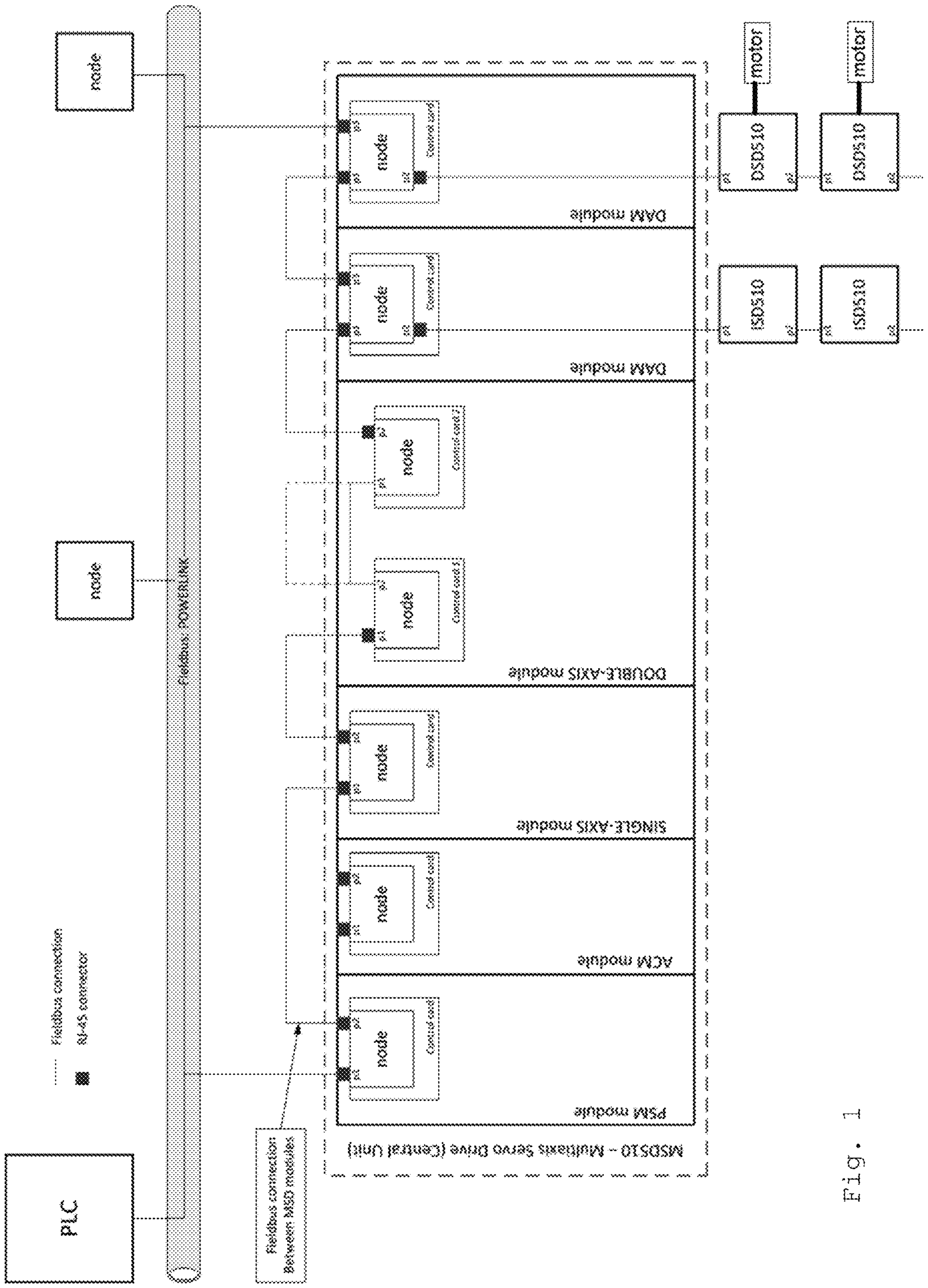
FIG. 1: Ethernet powerlink fieldbus with connected devices.

FIG. 1 shows an Ethernet powerlink fieldbus with connected devices. The present invention concerns the setting up such a fieldbus networks. In order to perform the set up, it is required to assign identifiers (ID) to the fieldbus components of the network. In particular, the assignment of identifiers has the purpose of setting node IDs on all integrated servo drives (ISD), decentral servo drives (DSD) and/or multiaxis servo drive systems (MSD510) devices installed on the Ethernet powerlink fieldbus.

The ISD is a device integrating control logic and the controlled motor. The DSD may be a device integrating control logic, that controls an external motor. The MSD510 is a system including some or all of the following modules:

- PSM—Power Supply Module
- DAM—Decentral Access Module. An intelligent three ports switch capable to distribute power and network data to other devices. Having three ports means that it can be used to create a tree network by adding corresponding sub-branches.
- ACM—Auxiliary Capacitor Module
- SDM—Servo Drive Module In view of the described Ethernet powerlink fieldbus, the presently described method comprises the steps of

- setting the fieldbus network into a service mode;
- scanning the fieldbus network;
- decomposing the fieldbus network into linear branches and switches;
- scanning each linear branch; and
- assigning unique identifiers to the controlled nodes of the fieldbus network, wherein the identifiers comprise the relative positions of the controlled nodes in the fieldbus network and a node number.

At least one of the steps may be performed automatically. Additionally or alternatively, another step of the method may comprise manually setting the identifier of a specific controlled node selected through a positional index. Therefore, depending on the circumstances, the present invention provides flexibility in the setting up of the fieldbus network.

Furthermore, at least some of the steps may be performed by a software application running on a computer connected to the fieldbus network. Preferably, some or all controlled nodes may be assigned a unique identifier as an incremental or decremental value starting from a selected node number.

The computer may be an integrated component of the fieldbus network or it may be an external device, such as a portable computer, a tablet or a smartphone, which is connectable to the fieldbus network. The assignment of the identifiers may hence be easily conducted in field conditions, using readily available equipment.

At least some of the steps may be performed by at least one power supply module (PSM) and/or at least one decentral access module (DAM), preferably triggered by a local control panel (LCP).

At least some of the method's steps may be performed by a decentral access module (DAM) triggered by a programmable logic controller (PLC). As in the other embodiments, some or all controlled nodes are assigned a unique identifier as an incremental or decremental value starting from a selected node number. The assigned controlled nodes may be connected to the same hybrid cable of the decentral access module (DAM).

The controlled nodes may comprise at least one multiaxis servo drive system (MSD), preferably one or more integrated servo drive (ISD) and/or decentral servo drive (DSD), and/or the fieldbus network may be an Ethernet powerlink fieldbus. The multiaxis servo drive system (MSD) may comprise the power supply module (PSM) together with the decentral access module (DAM), and/or one or more auxiliary capacitor module (ACM) and/or one or more servo drive module (SDM).

Once a unique identifier has been assigned to a controlled node, the node may be set to operational mode. The network may be set into the service mode automatically at the beginning of the process and prior to the assignment of identifiers. Once a controlled node is assigned a unique identifier, the node may also be requested to quit the service mode, i.e. set to operational mode.

Once all nodes have been assigned their identifiers, a broadcast "Service Mode OFF" command may be sent to them to make sure that the full network is back to nominal operational conditions. The operation of the network may commence immediately with no need for any manual steps such as resetting or power-cycling the entire network to quit service mode. All these steps may be performed automatically.

Figure 2A:
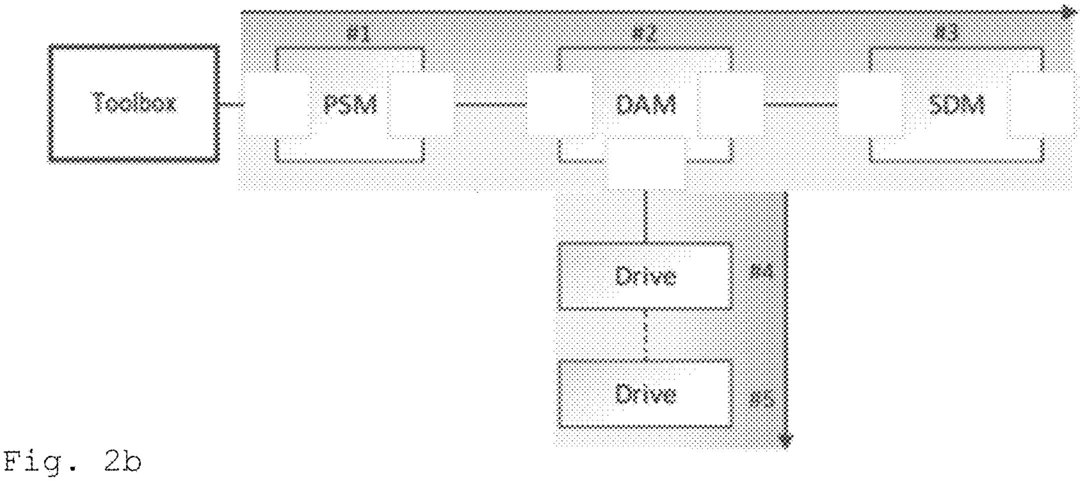
FIG. 2*a*: ID assignment of full fieldbus network managed by the Toolbox.
Figure 2B:
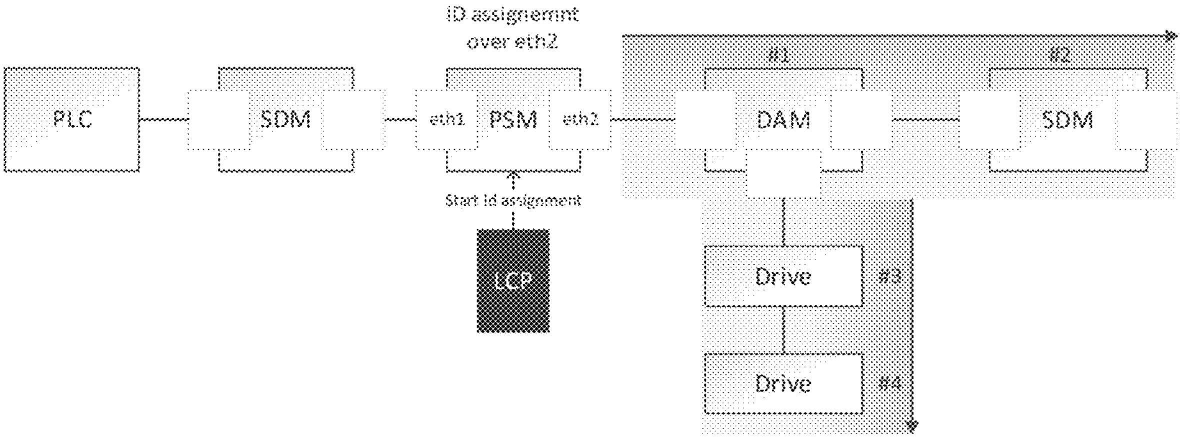
FIG. 2*b*: ID assignment of devices visible from PSM eth2 port, triggered via LCP.
Figure 2C:
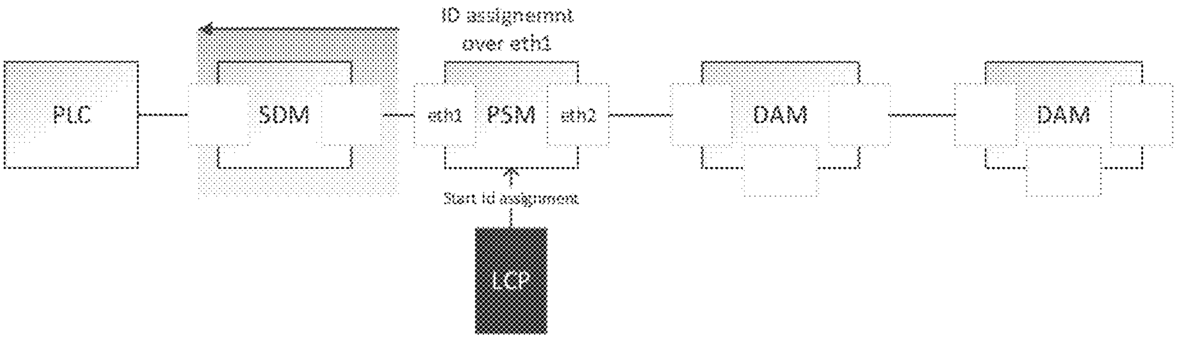
FIG. 2*c*: ID assignment of devices visible from PSM eth1 port, triggered via LCP.
Figure 3A:
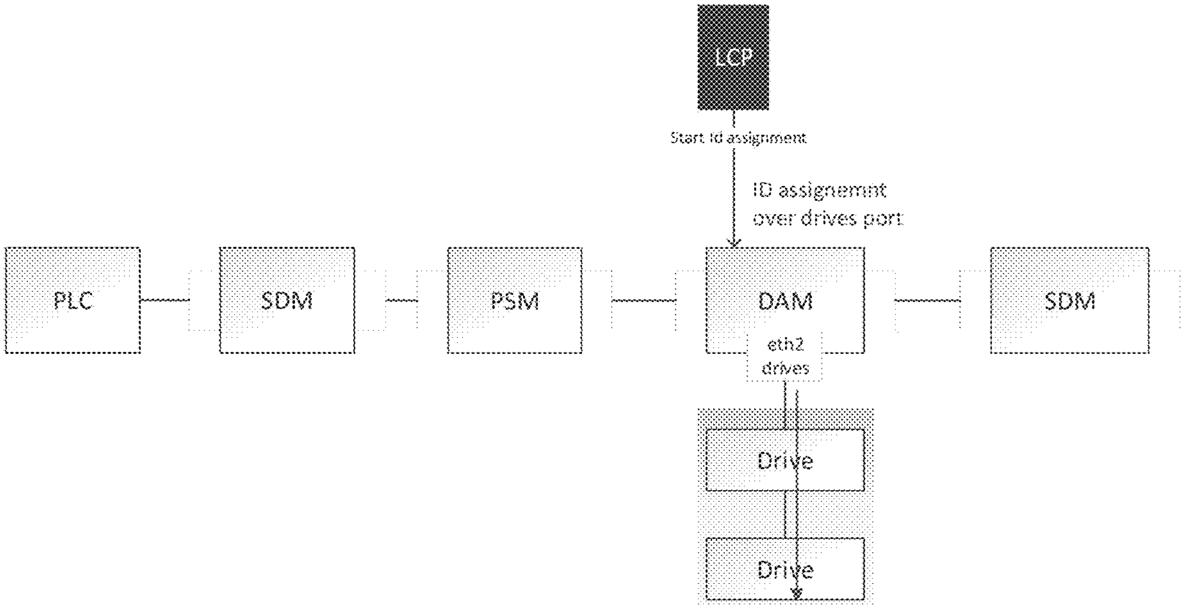
FIG. 3*a*: ID assignment of drives visible from DAM hybrid port, triggered via LCP.
Figure 3B:
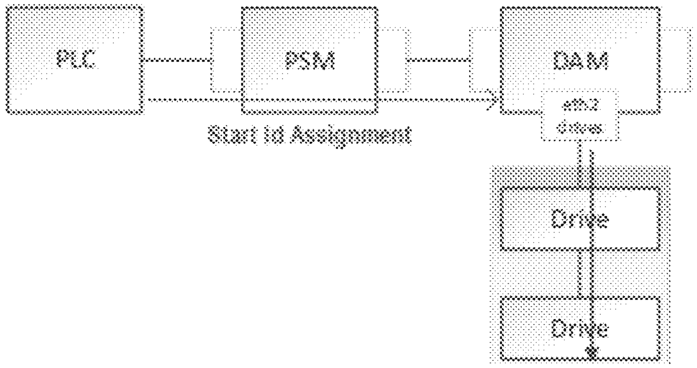
FIG. 3*b*: ID assignment of drives visible from DAM hybrid port, triggered via PLC.

In a powerlink network, each controlled node (CN) may be assigned a unique ID, in the range of, e.g. 1-239, before the system can be set to operational state or operational mode. The present invention therefore provides the possibility to perform, either through a local control panel (LCP), a toolbox or a programmable logic controller (PLC), one or more of the following operations:

- The automatic setting via toolbox of the node ID on all connected devices, as an incremental/decremental value starting from a selected ID as shown in FIG. 2*a*.
- The automatic setting via PSM/DAM, triggered using LCP, of the node ID on all devices connected to a network branch as shown in FIG. 2*b*, FIG. 2*c* and FIG. 3*a*.
- The automatic setting via PLC of the node ID, as an incremental/decremental value starting from a selected ID, on drive devices connected to the same hybrid cable of a single DAM as shown in FIG. 3*b*.
- The manual setting of the node ID on one specific device selected through a positional index via toolbox or LCP.

The LCP may be an external device with e.g. a display and/or a keyboard, used as human-machine interface. It can be connected to a single device of the fieldbus network, via e.g. a cable.

The toolbox may be understood to be a software application running on e.g. a common PC connected via Ethernet to the fieldbus network. Toolbox software can act as a managing node and can execute the network scan and the node ID assignment algorithms.

The LCP may have no capability to execute any algorithm or step of the presently described invention by itself. It may only be used to specify the input parameter values and then to prompt the connected devices (either PSM or DAM device) to execute the ID assignment algorithm ap-plying those input parameter values.

The implementation of the full network scan and node ID assignment algorithms on a PLC poses some challenges. The presently described use of the LCP enables the specification of the input parameter values on the PLC. Once the input parameter values have been specified, the PLC prompts a specific DAM device to execute the ID assignment algorithm applying those input values.

FIGS. 2*a*-2*c*, 3*a* and 3*b* show various possibilities of node ID assignment of the present invention. FIG. 2*a* shows ID assignment of a fieldbus network managed by the Toolbox. FIG. 2*b* shows node ID assignment of devices visible from PSM eth2 port and triggered via the LCP. FIG. 2*c* shows node ID assignment of devices visible from PSM eth1 port and triggered via the LCP. FIG. 3*a* shows node ID assignment of drives visible from DAM hybrid port and triggered via the LCP. FIG. 3*b* shows node ID assignment of drives visible from DAM hybrid port and triggered via the PLC.

Figure 4A:
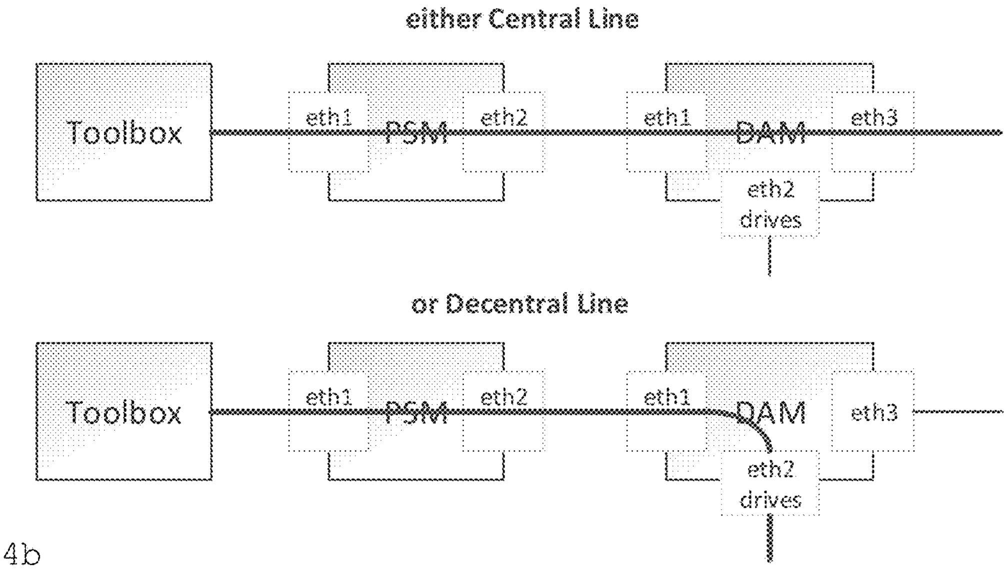
FIG. 4*a*: central and decentral forwarding for configuration.

FIG. 4*a* shows central forwarding of packets for the configuration of the DAM device at the top and decentral forwarding of packets for the configuration of the DAM devise at the bottom. For both, automatic and manual ID assignment to properly work, DAM devices are configured correctly by either Toolbox or PSM, so that incoming packets are forwarded over either a Central or a Decentral line as shown in the figure.

A set of 32-bits registers is implemented in a field programmable gate array (FPGA) for this purpose. Higher 16 bits of first register may hold bits masking port connections as shown in the following table:

| b31 | b30 | b29 | b28 | b27 | b26 | b25 | b24 | b23 | b22 | b21 | b20 | b19 | b18 | b17 | b16 |
|---|---|---|---|---|---|---|---|---|---|---|---|---|---|---|---|
| Not used | p3-->p2 | p3-->p1 | p3-->p0 | p2-->p3 | Not used | p2-->p1 | p2-->p0 | p1-->p3 | p1-->p2 | Not used | p1-->p0 | p0-->p3 | p0-->p2 | p0-->p1 | Not used |

Each bit is used to disable/enable respective connections between ports. For example, setting bit 23 to high disables forwarding of packets in the hub from port 1 to port 3.

In order to execute the network scan and ID assignment algorithm on a complex network topology, the routing and forwarding of Ethernet frames or packets over the network has to be con-trolled. This is feasible with all devices belonging to the presently described method and fieldbus network. It is a feature that may be considered commonly available on any advanced multi-port networked device.

A significant feature of the present invention is that specific routing paths are created, which make it possible to partition a complex tree network in single linear sub-branches.

Figure 4B:
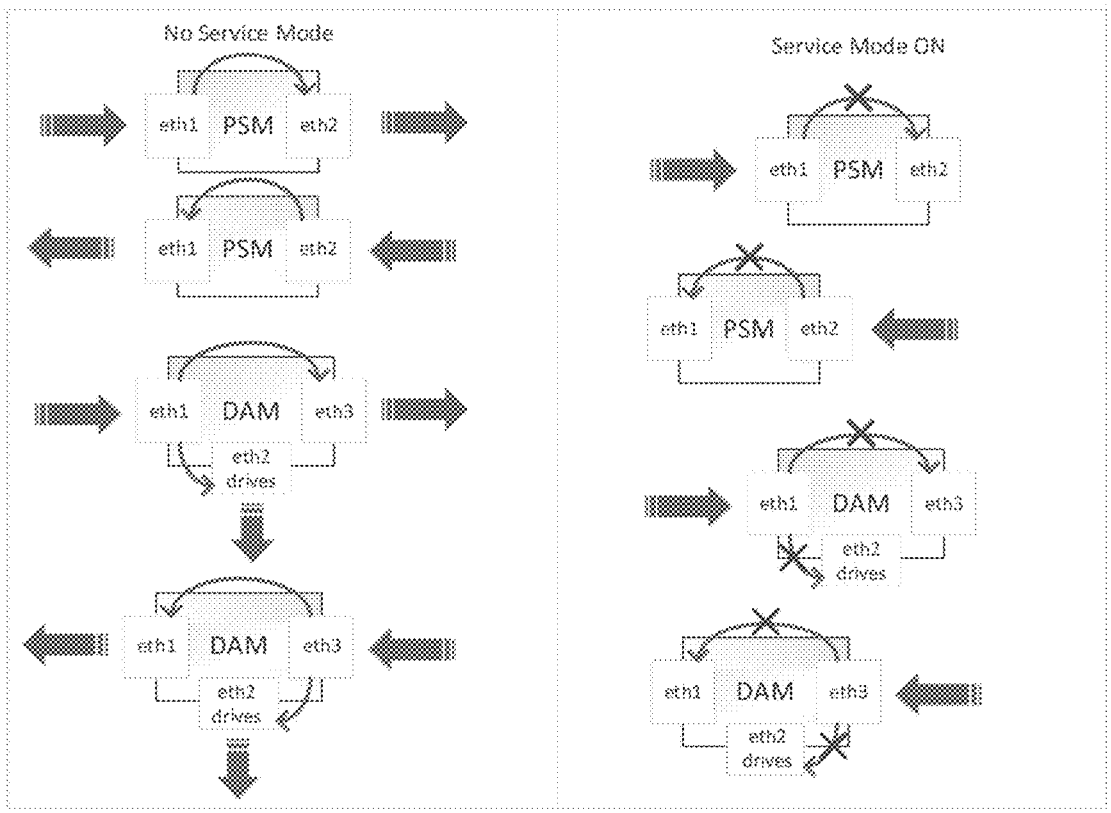
FIG. 4*b*: manual ID assignment.

Manual ID assignment is achieved setting all devices connected on the fieldbus network in "Service Mode". Service Mode means that messages introduced at the input of any port will not ap-pear at the output of the other external ports, as shown in FIG. 4*b*.

Service Mode is implemented through some special TFTP (Trivial File Transfer Protocol) write transfer commands. This requires having a dedicated continuous task in the device NIOS firmware, which is an instance of a class that may be called CserviceModeTftpD. In particular, the following commands may be managed by this class, referring to central or decentral forwarding of packets:

ServiceMode ON
ServiceMode OFF
ServiceMode CentralOFF (DAM only)
ServiceMode CentralON (DAM only)
ServiceMode DecentralOFF (DAM only)
ServiceMode DecentralON (DAM only)

Commands may always be sent to broadcast a destination (e.g. node ID 255). For DAM only, it may be possible to address a single DAM device specifying the device MAC address as a command argument. The MAC address may by definition be a unique "burned-in" address assigned by the manufacturer of the corresponding hardware. When the network scan of the present invention is performed, the MAC addresses may be checked anyway for uniqueness, as a check on DAM's MAC addresses uniqueness may be required for some reason. Should no MAC address be specified, the command may be processed in broadcast by any DAM receiving it.

Figure 5A:
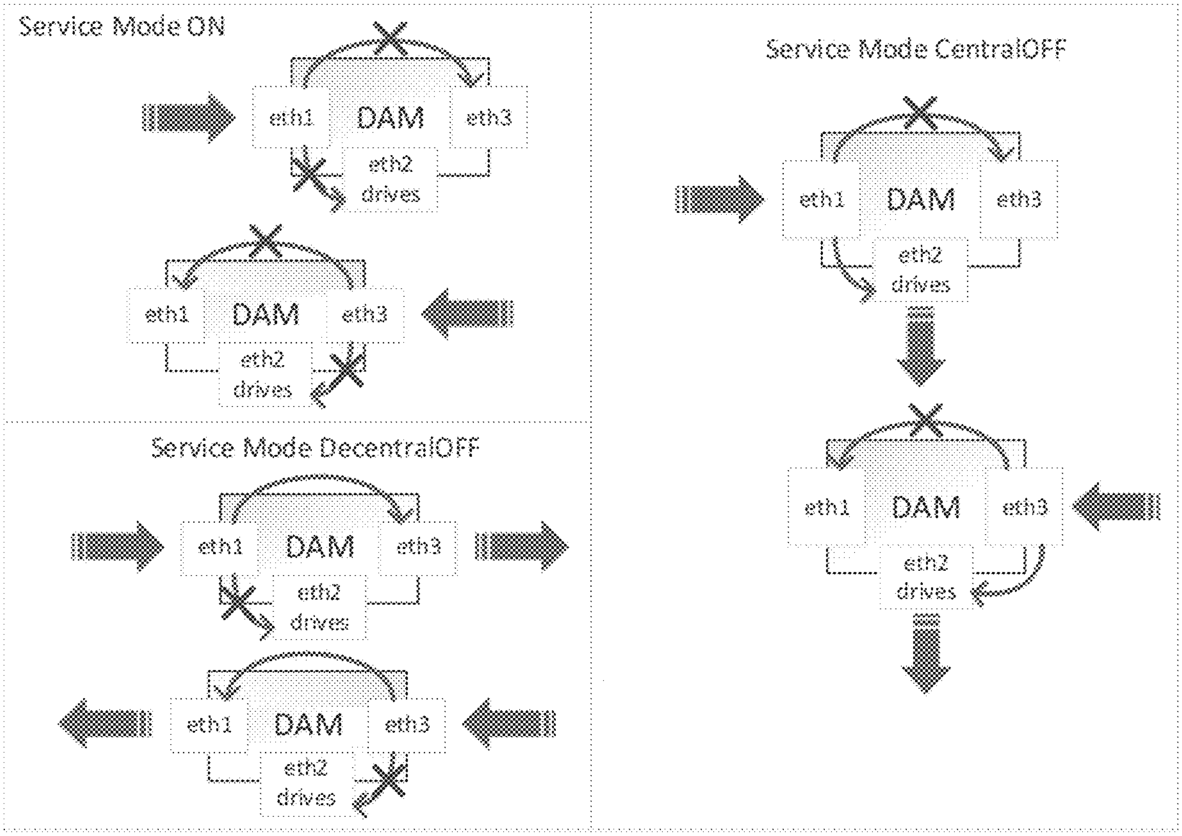
FIG. 5*a*: more details on ServiceMode.

As shown in more detail in FIG. 5*a*, ServiceMode ON/OFF may disable/enable forwarding of packets on all ports of every device receiving the corresponding request. The remaining commands are meaningful for DAM only: ServiceMode DecentralOFF/ON will disable/enable forwarding on DAM drives port (eth2), while ServiceMode CentralOFF/ON will keep forwarding of packets enabled/disabled on DAM drives port (eth2) only.

Figure 5B:
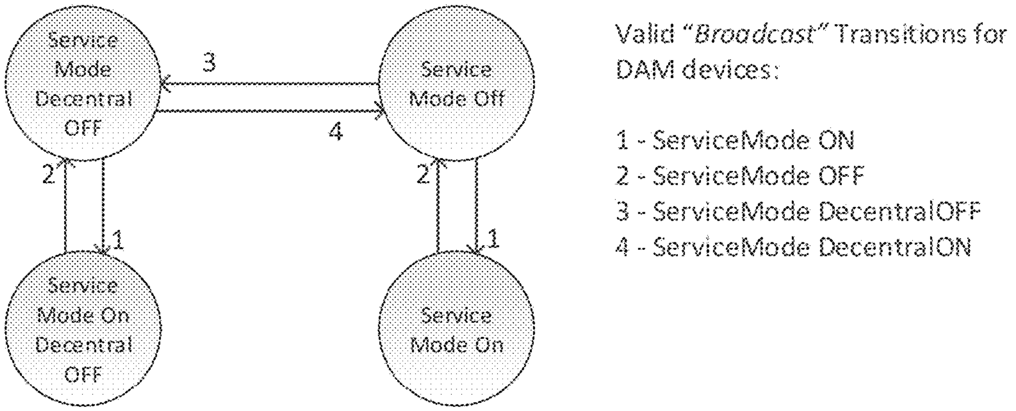
FIG. 5*b*: state diagram for issued Broadcast requests for DAM devices.

It may be possible for DAM devices only to change Service Mode configuration using requests addressing either all or just one specific device. In particular, the state diagram of FIG. 5*b* ap-plies when Broadcast requests (no MAC address specified) are issued over the fieldbus network.

Figure 6A:
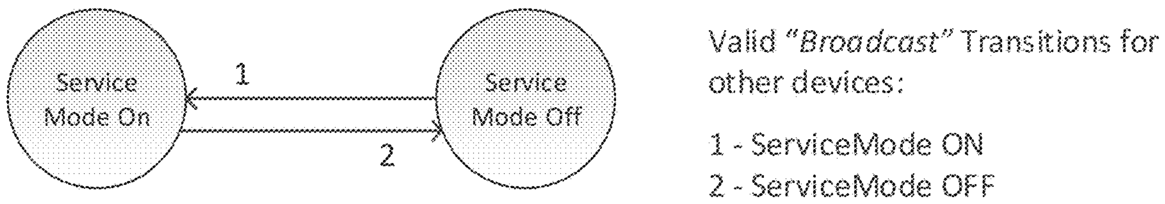
FIG. 6*a*: state diagram for issued Broadcast requests for other devices.

Invalid transitions requests may be any requests, which are not reported in the Valid "Broadcast" Transition list. Such requests may simply be ignored. For all other devices, that is, devices different from DAM, the only valid broadcast ServiceMode command may be ServiceMode ON and ServiceMode OFF. Any other command may simply be ignored as indicated in FIG. 6*a*.

Figure 6B:
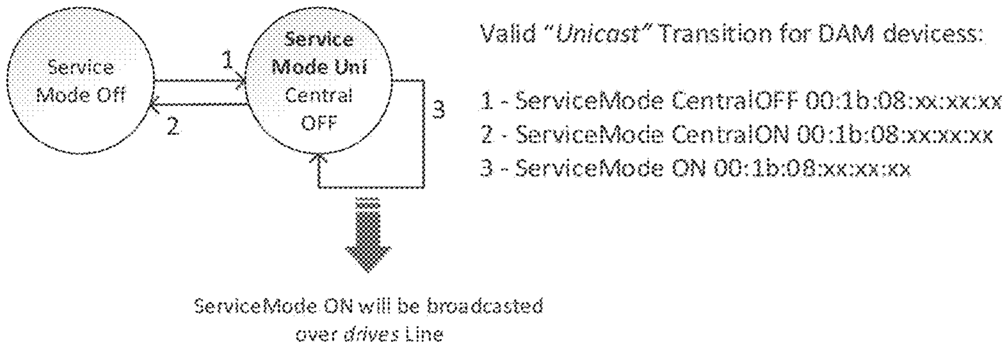
FIG. 6*b*: state diagram for issued Unicast requests for DAM devices.

For DAM only, when single device requests are used, the state diagram of FIG. 6*b* applies.

Invalid transitions requests may be any requests, which are not reported in the Valid "Unicast" Transition list. Such requests may again simply be ignored. Broadcast requests received while in Service Mode Uni may also be ignored. A unicast ServiceMode ON request received while in Service Mode Uni Centrall OFF may be broadcast over drives (eth2) port, leaving the DAM itself in Service Mode Uni Centrall OFF. All devices, either DAM or non-DAM devices, receiving "Unicast" commands destined to a different recipient may simply ignore them, whereby the "Unicast" commands may be sent anyway using Broadcast transmission.

Figure 7:
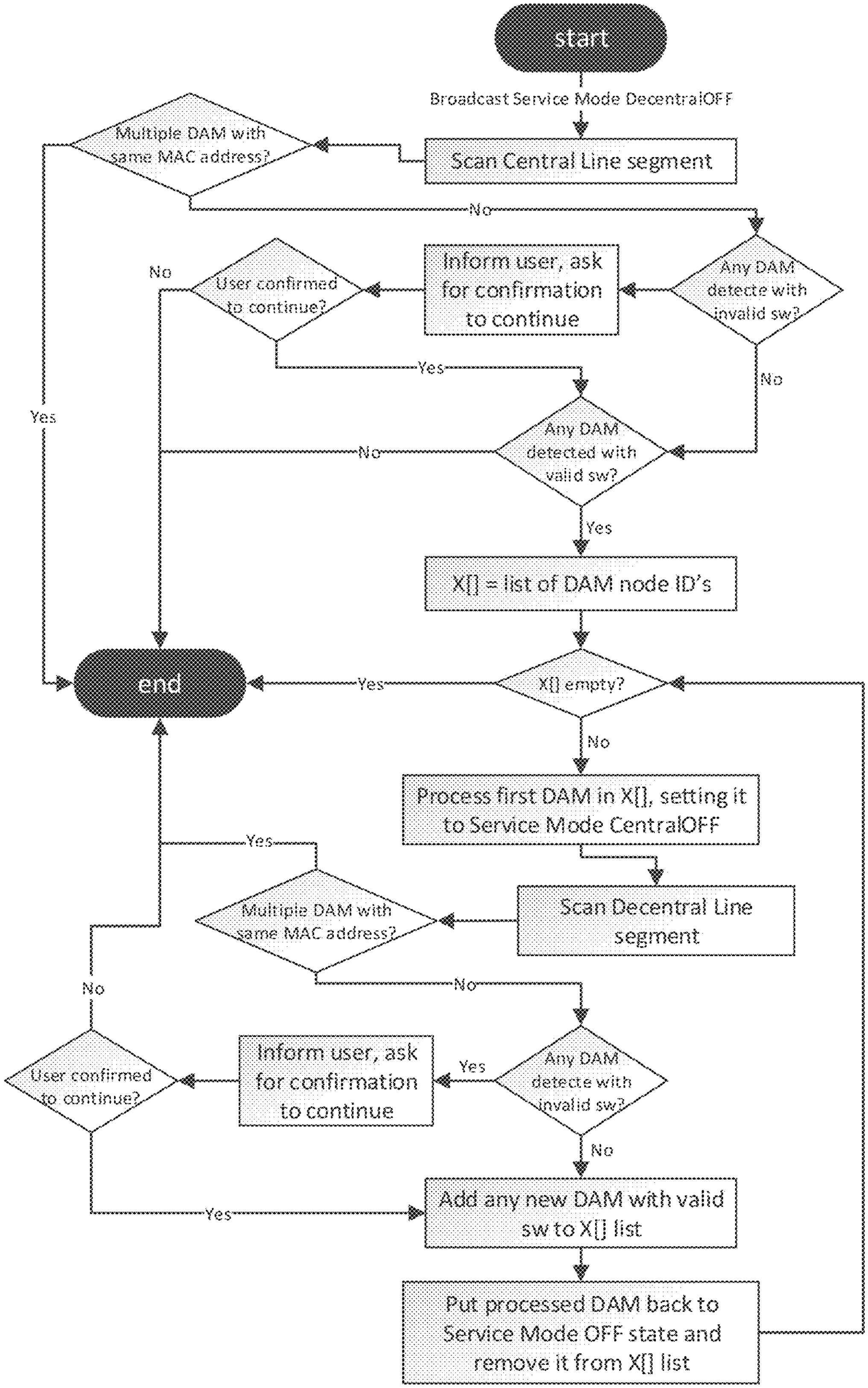
FIG. 7: identification of all nodes connected to partitioned segment.

For both, automatic and manual ID assignment, it may be required to identify all devices reachable on the fieldbus network. This may be achieved through the Network Scan operation. During the Network Scan, the full network may be partitioned in Central and Decentral segments using Service Mode commands. Any partitioned segment is examined for identifying all nodes connected to the segment itself, as shown in the flow chart of FIG. 7.

Figure 8A:
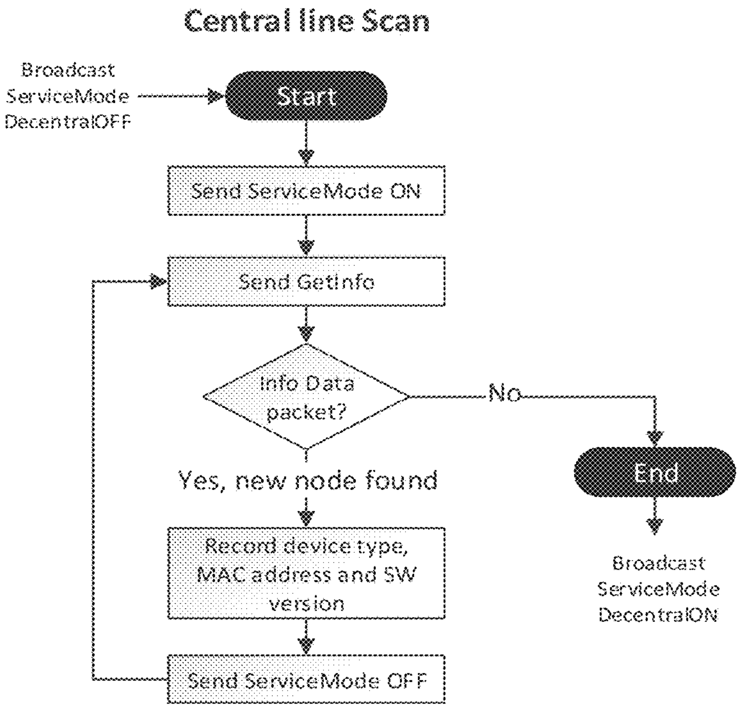
FIGS. 8*a* and 8*b*: scan procedures for central and decentral lines.
Figure 8B:
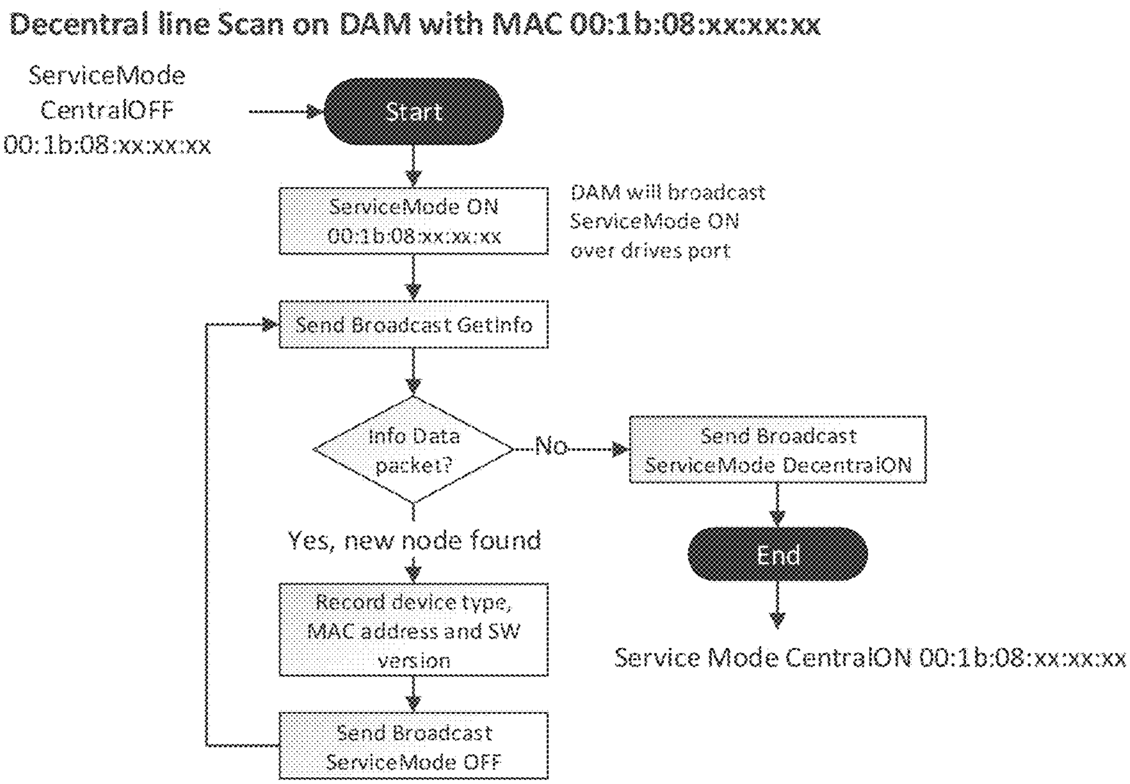

Scanning every segment via either Central or Decentral may require some additional special TFTP messages as shown in the flow charts of FIGS. 8*a* and 8*b*. In particular, GetInfo request and Info Data Packet reply messages may be used. Info Data Packet reply data may provide the full device identify, including device type, software version and MAC address.

Figure 9:
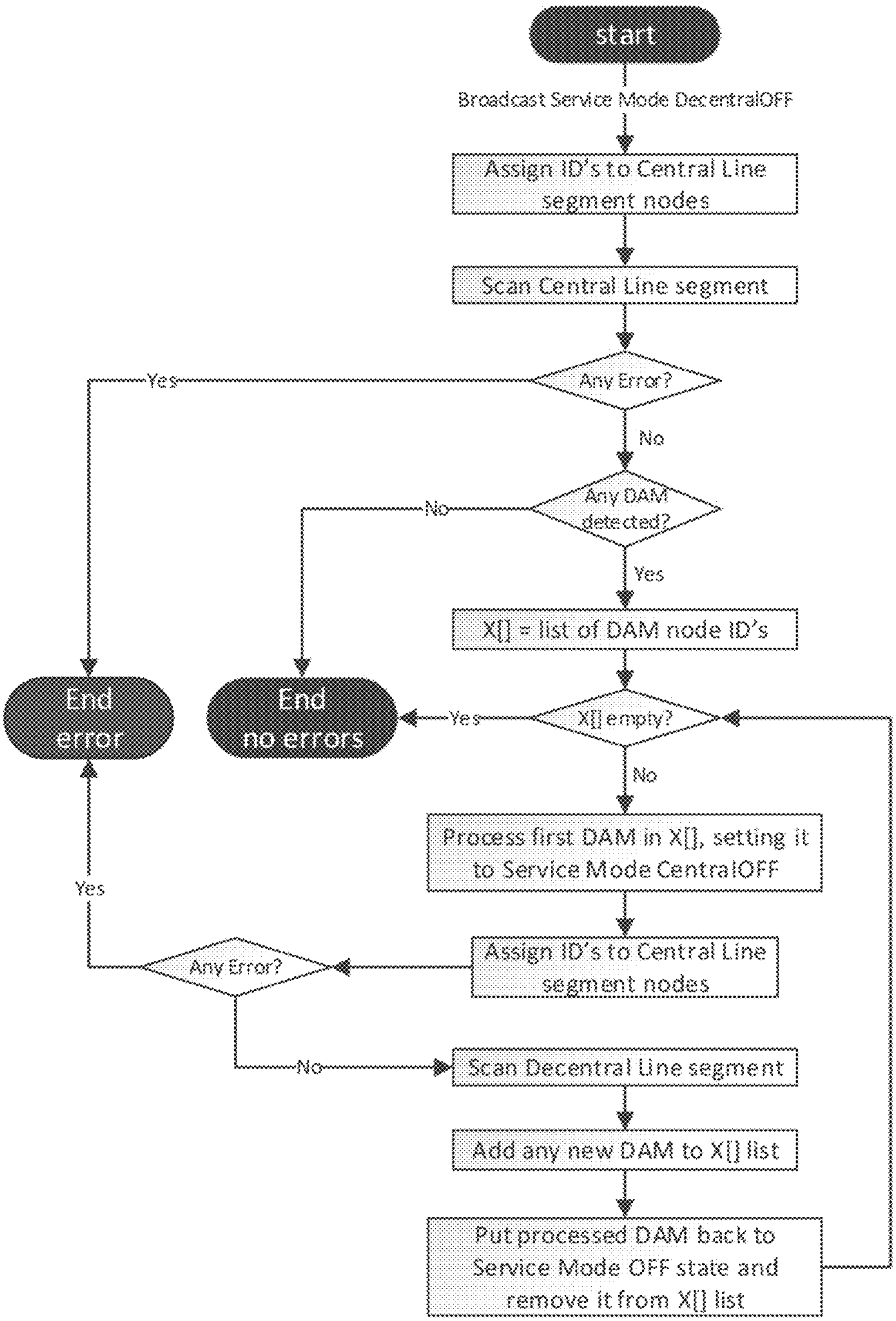
FIG. 9: summary of full algorithm executed by the toolbox.

When a full network automatic ID assignment is executed either by the Toolbox or by the PSM, the network may be partitioned into Central and Decentral segments using Service Mode commands and using an algorithm similar to the one previously described for the Network Scan operation. Any partitioned segment may be assigned IDs to all its nodes. A scan may then be performed after the IDs have been assigned in order to detect the presence of DAM devices, which may be origins of new Decentral Line branches. The procedure is iterated until all discovered Decentral Lines have been processed. The flow chart of FIG. 9 summarizes a possible full corresponding algorithm executed by the Toolbox.

Figure 10:
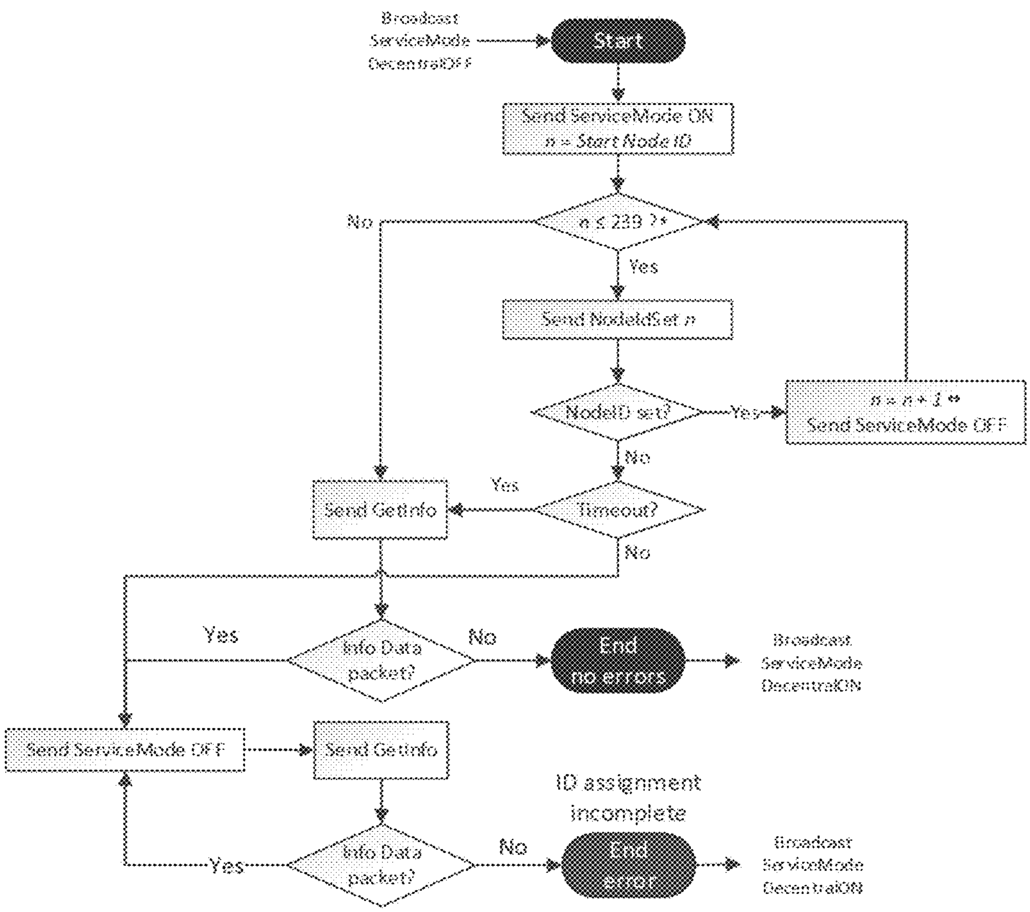
FIG. 10: ID assignment procedures for central lines.

ID assignment to nodes belonging to any segment (either Central or Decentral) may require some additional special TFTP messages. In particular, NodeIdSet request and NodeId set/not set reply messages may be required, as shown in the flow charts of FIGS. 10 and 11*a*, describing ID assignment procedures for both Central and Decentral lines.

In case of ID overflow/underflow (value 239/1 is reached) or generic error (ID is not set), it may be necessary to verify the presence of additional nodes on the fieldbus network. Any node found shall be put out of Service Mode. Incomplete ID assignment error shall then be notified to a system user. The same ID overflow handling may be applied to Decentral line ID assignment:

In case of ID assignment triggered via LCP or Toolbox on a PSM device, the algorithm executed by the Toolbox may be the same, with the addition of disabling the Ethernet port not selected for the assignment before starting to execute the procedure. The same port may be reenabled once all ID's have been assigned. Handling of the whole procedure may be managed by a dedicated event task in the PSM firmware, which is an instance of class CNodeIdAssign as shown in FIG. 11*b*. Here, * indicates that PSM will additionally make sure that assigned IDs are different from its own ID.

Figure 12:
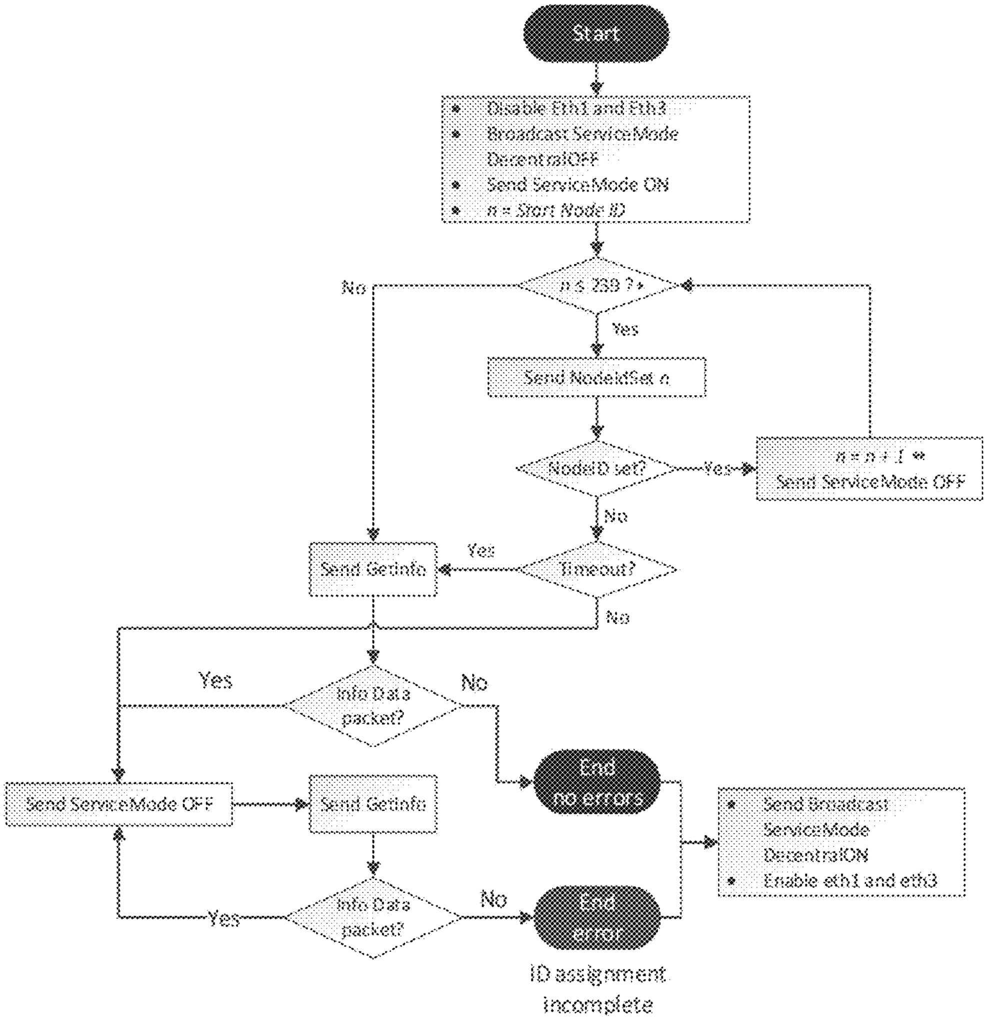
FIG. 12: decentral line ID assignment through DAM triggered via LCP.

For ID assignment triggered via LCP or Toolbox on a DAM device, the algorithm may be similar to the one described in the Decentral line ID assignment flow chart of FIG. 12. In addition, in this case DAM will make sure to avoid overlapping with its own ID. Handling of the whole procedure may be managed by a dedicated event task in the DAM firmware, which may be an instance of class CNodeIdAssign.

For ID assignment triggered via PLC on a DAM device, the algorithm may be similar to the one described above, with some relevant additions. The addressed DAM device may have to:

- completely disable (in both tx and rx directions) Eth1 and Eth3 ports,
- power down all the drives switching off UAUX 24V supply line,
- execute a software reset, and/or
- wait for all drives to turn on and enter network management (NMT) Basic Ethernet state, before starting to execute the assignment algorithm.

Figure 13:
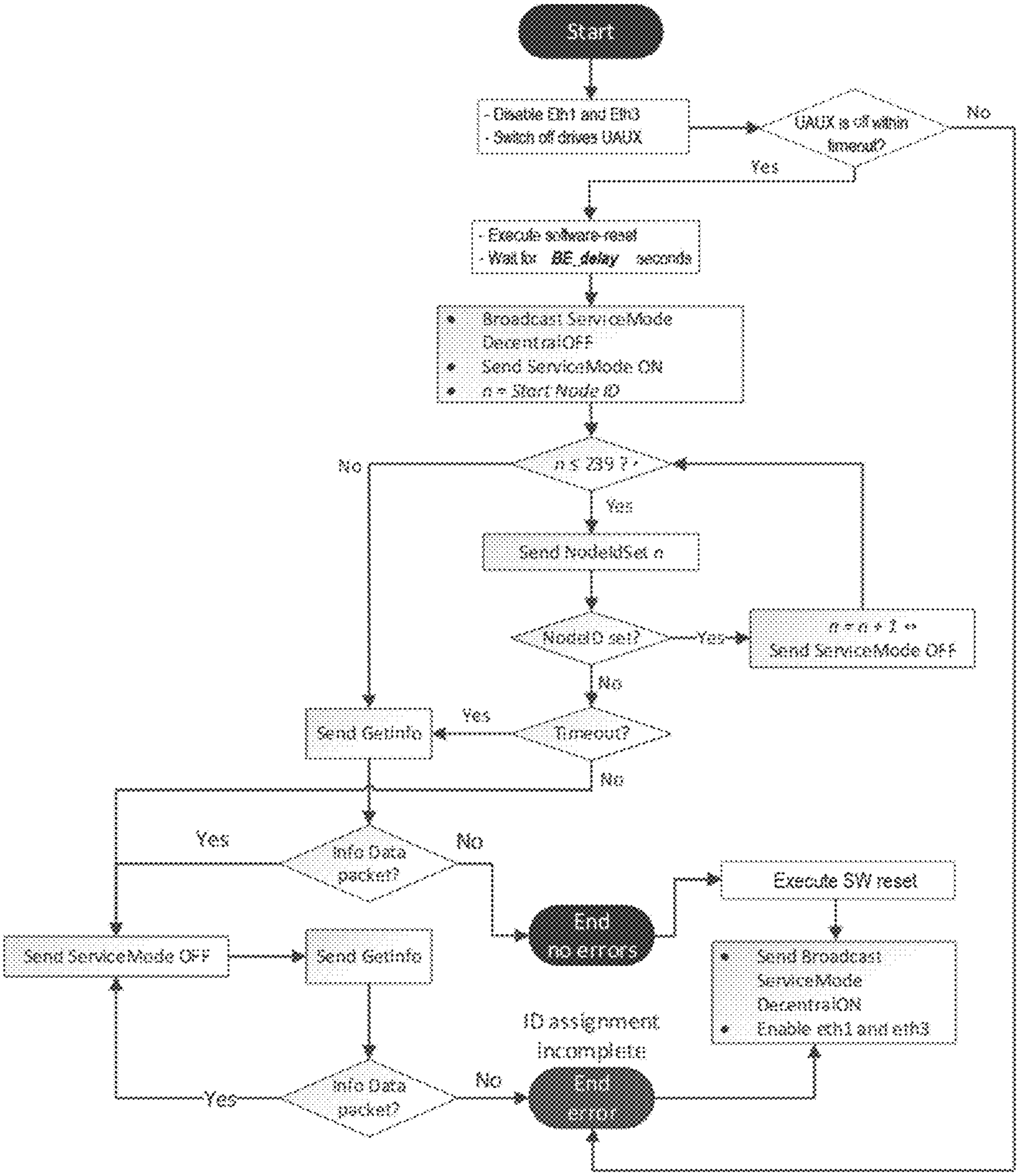
FIG. 13: decentral line ID assignment through DAM with ID x.

Once the assignment is complete, the DAM device may reset itself. This will also generate a final power-cycle of all drives via UAUX 24V supply line. The whole procedure is summarized in the diagram of FIG. 13.

Figure 14:
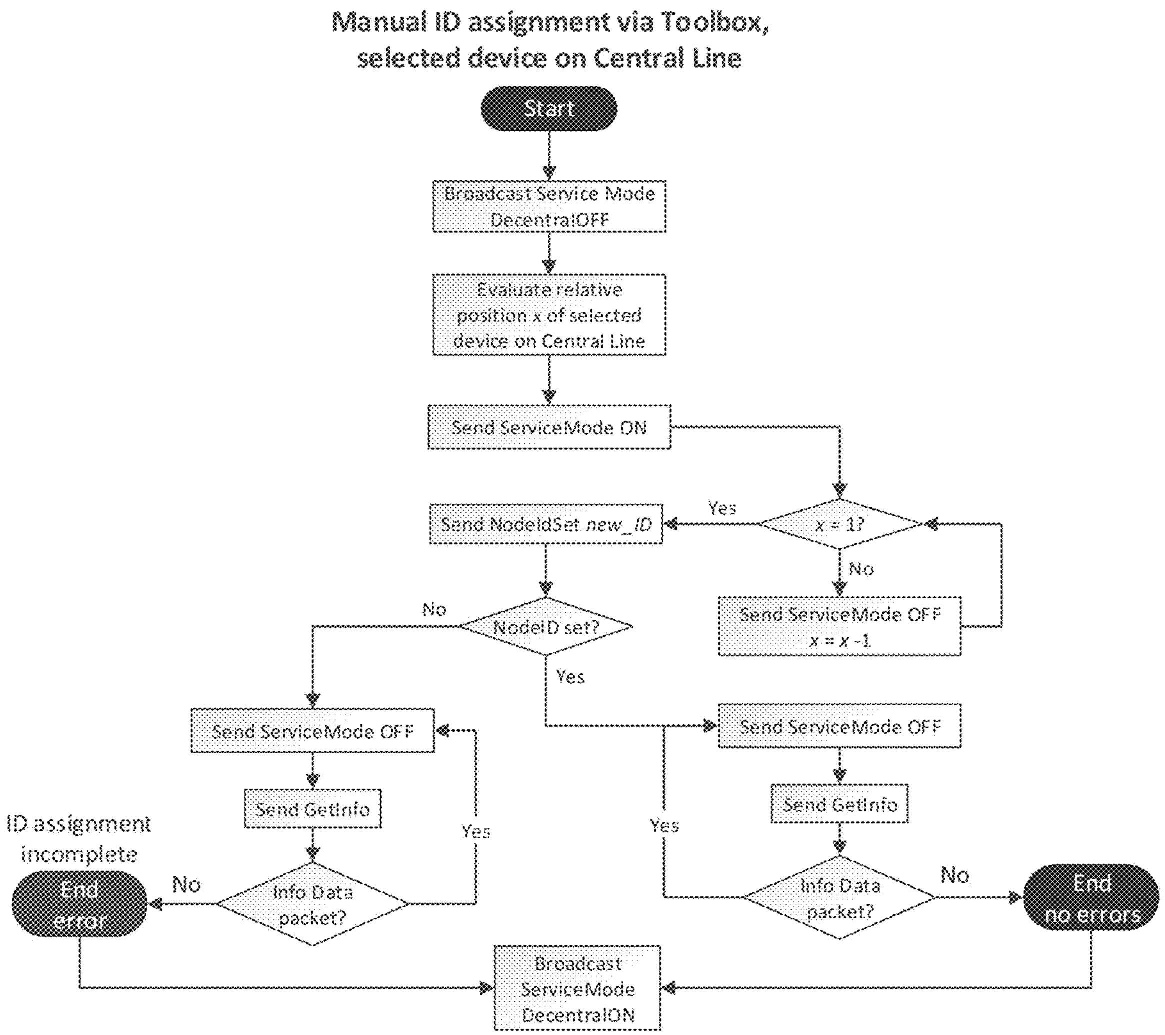
FIGS. 14 and 15*a*: manual ID assignment via Toolbox/PSM.
Figure 15A:
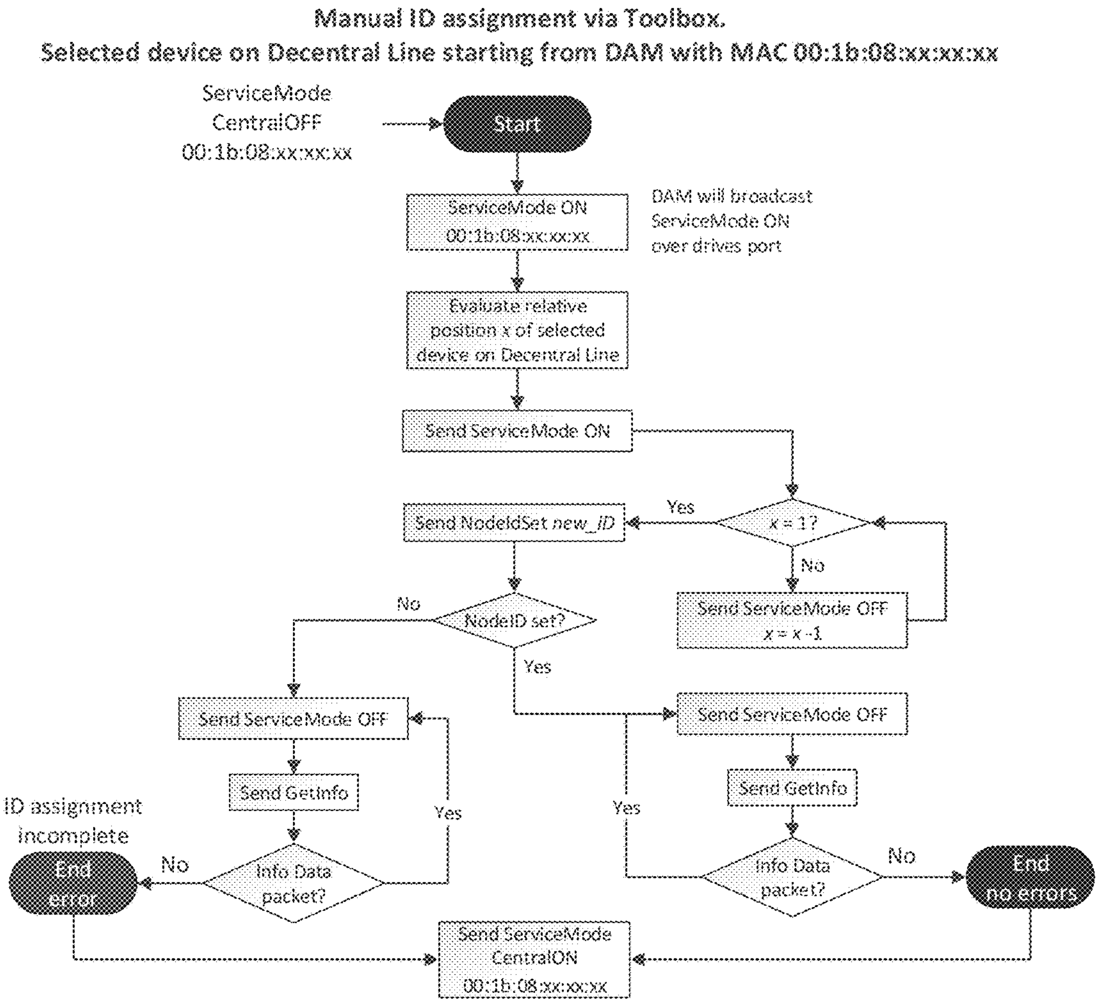
Figure 15B:
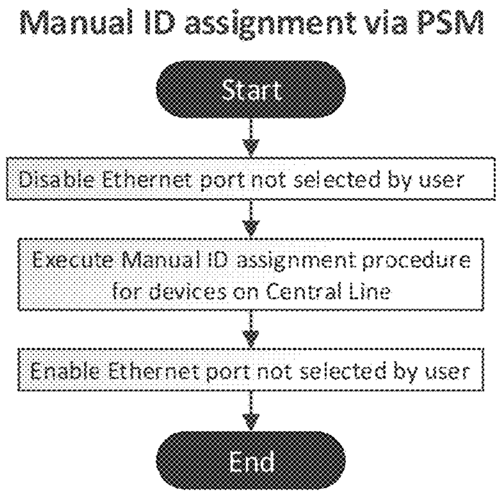
FIG. 15*b*: manual ID assignment via PSM.

Node ID manual assignment may be available on the Toolbox after the fieldbus network has been scanned. The system user will then have the possibility to manually select any device found on the network and to assign a new ID to the device. Once the device is selected and the new ID value is inserted, the Toolbox will have to reach the device and set the new ID using the proper procedure, which will depend on the device position on the network. Two different procedures are conceivable for this: one to be executed in case the selected device is connected on the fieldbus Central Line and another one for devices connected on a Decentral Line, as shown in FIGS. 14 and 15*a*.

In case of Manual ID assignment triggered via LCP on a PSM device, the algorithm is the same, with the addition of disabling the Ethernet port not selected for the assignment before starting to execute the procedure. The same port shall be re-enabled once all ID's have been assigned. Also, a relative device positional index (x value in the flow chart of FIG. 15*a*) may be a user selected index instead of an evaluated parameter.

Figure 16A:
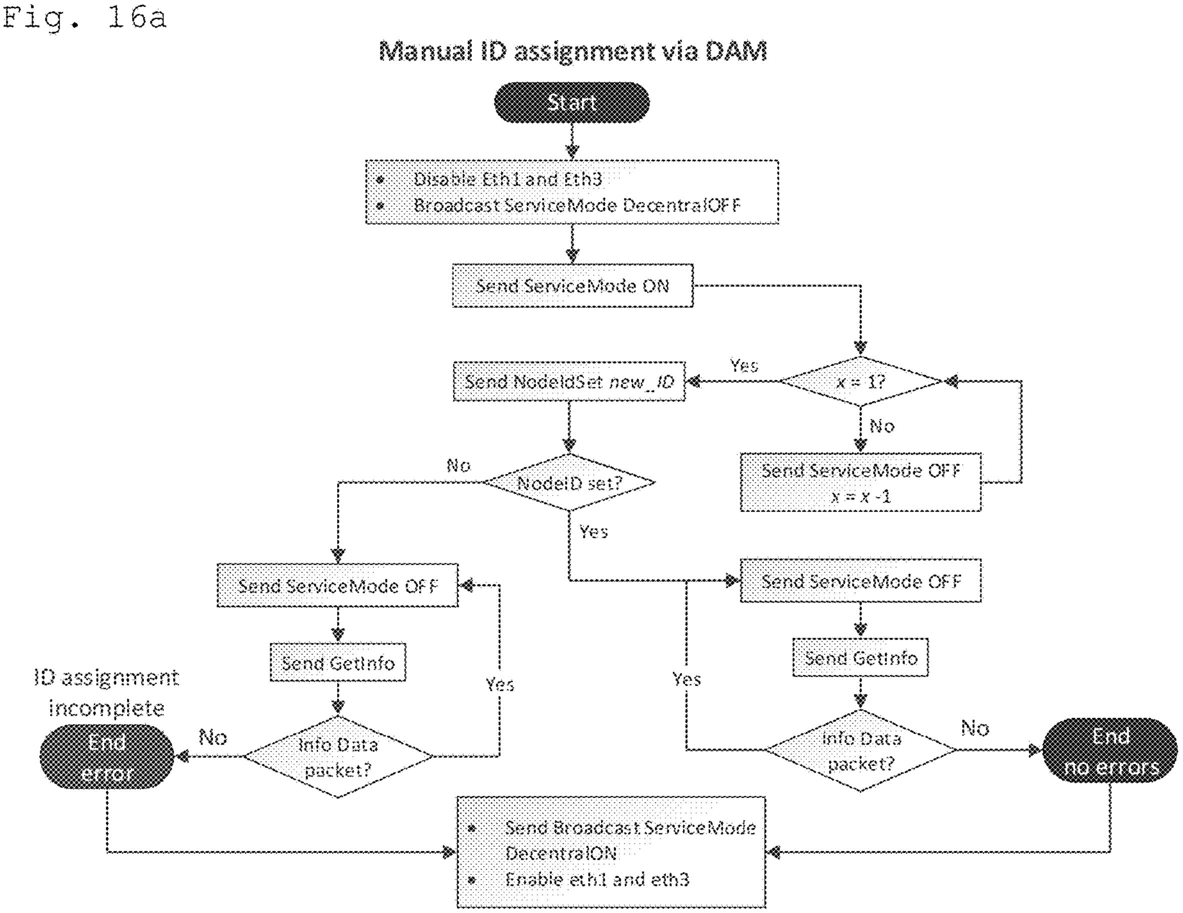
FIG. 16*a*: manual ID assignment via DAM.

For Manual ID assignment triggered via LCP on a DAM device, the algorithm is still similar to the one executed by the Toolbox. The relative device positional index (x value in the flow chart of FIG. 16*a*) may be a user selection instead of an evaluated parameter.

Figure 16B:
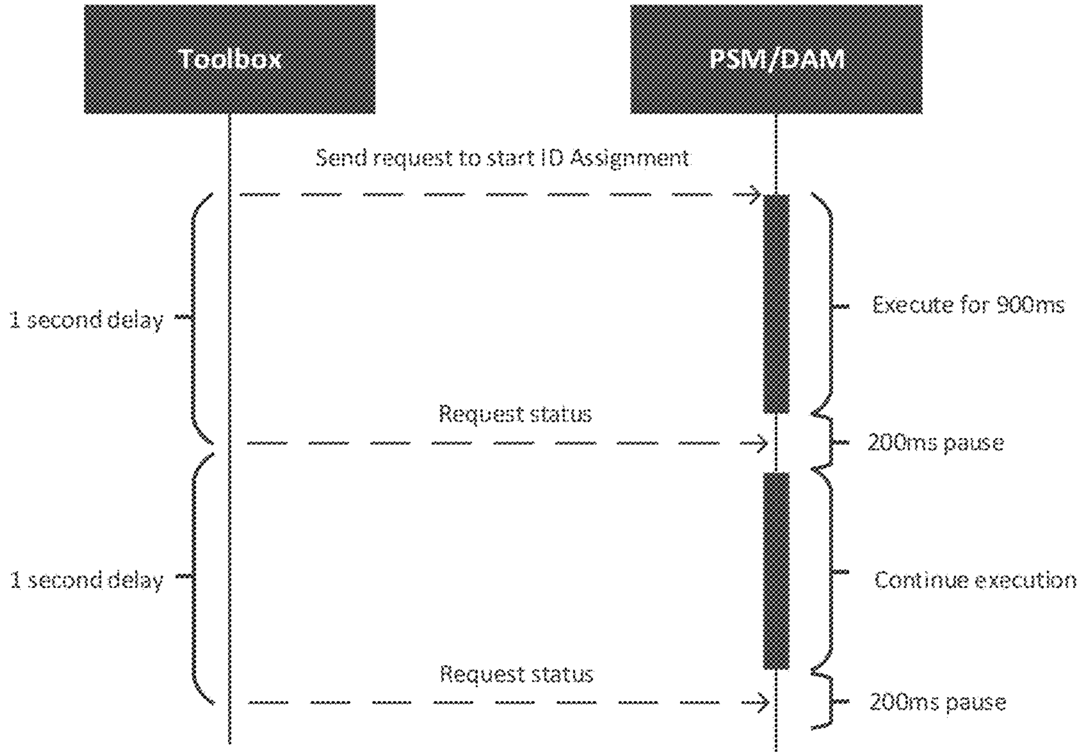
FIG. 16*b*: checking execution status.

The Toolbox provides PSM and DAM sub-tools for the execution of Automatic and Manual ID assignment through the selected PSM or DAM device. The Toolbox can be used to request PSM/DAM to execute the ID assignment. That is, it can be used like an LCP. When Manual ID assignment is executed via PSM/DAM sub-tool, the positional index value of the node to be assigned is provided as relative positional value with respect to the selected PSM/DAM. During ID assignment execution through PSM/DAM, the Toolbox will check the execution status exactly every e.g. second to avoid conflicts on the bus as shown in FIG. 16*b*.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A method for automatically assigning identifiers to controlled nodes of a fieldbus network, the controlled nodes comprising a plurality of electric motor drive systems, IO devices and/or feedback sensors, wherein the method comprises the steps of setting the fieldbus network into a service mode;

scanning the fieldbus network;

decomposing the fieldbus network into linear branches and switches;

scanning each linear branch; and generating and automatically assigning, by a programmable logic controller (PLC) and without manual input, unique identifiers to the controlled nodes of the fieldbus network based on the scanning the fieldbus network and the decomposing the fieldbus network, wherein the identifiers comprise relative positions of the controlled nodes in the fieldbus network and a node number.

2. The method according to claim 1, wherein at least one of the steps is performed automatically and/or that a step of the method comprises manually setting the identifier of a specific controlled node selected through a positional index.

3. The method according to claim 1, wherein at least some of the steps are performed by a software application running on a computer connected to the fieldbus network, wherein some or all controlled nodes are assigned a unique identifier as an incremental or decremental value starting from a selected node number.

4. The method according to claim 1, wherein at least some of the steps are performed by at least one power supply module (PSM) and/or at least one decentral access module (DAM) triggered by a local control panel (LCP), wherein some or all controlled nodes are assigned a unique identifier as an incremental or decremental value starting from a selected node number.

5. The method according to claim 1, wherein at least some of the steps are performed by a decentral access module (DAM) triggered by the programmable logic controller (PLC), wherein some or all controlled nodes are assigned a unique identifier as an incremental or decremental value starting from a selected node number and wherein the assigned controlled nodes are connected to the same hybrid cable of the decentral access module (DAM).

6. The method according to claim 1, wherein setting the fieldbus network into a service mode comprises setting into service mode at least some or all of the controlled nodes automatically.

7. The method according to claim 1, wherein the controlled nodes comprise at least one multiaxis servo drive system (MSD), one or more integrated servo drive (ISD) and/or decentral servo drive (DSD), and/or that the fieldbus network is an Ethernet powerlink fieldbusEthernet.

8. The method according to claim 4, wherein the controlled nodes comprise at least one multiaxis servo drive system (MSD), one or more integrated servo drive (ISD) and/or decentral servo drive (DSD), and/or that the fieldbus network is an Ethernet powerlink fieldbusEthernet, wherein the multiaxis servo drive system (MSD) comprises the power supply module (PSM) together with the decentral access module (DAM), and/or one or more auxiliary capacitor module (ACM) and/or one or more servo drive module (SDM).

9. The method according to claim 1, wherein a controlled node is set to operational mode after being assigned its unique identifier.

10. A fieldbus network comprising a plurality of controlled nodes, electric motor drive systems, wherein the fieldbus network is provided for performing the method according to claim 1.

11. The method according to claim 2, wherein at least some of the steps are performed by a software application running on a computer connected to the fieldbus network, wherein some or all controlled nodes are assigned a unique identifier as an incremental or decremental value starting from a selected node number.

12. The method according to claim 2, wherein at least some of the steps are performed by at least one power supply module (PSM) and/or at least one decentral access module (DAM) triggered by a local control panel (LCP), wherein some or all controlled nodes are assigned a unique identifier as an incremental or decremental value starting from a selected node number.

13. The method according to claim 3, wherein at least some of the steps are performed by at least one power supply module (PSM) and/or at least one decentral access module (DAM) triggered by a local control panel (LCP), wherein some or all controlled nodes are assigned a unique identifier as an incremental or decremental value starting from a selected node number.

14. The method according to claim 2 at least some of the steps are performed by a decentral access module (DAM) triggered by the programmable logic controller (PLC), wherein some or all controlled nodes are assigned a unique identifier as an incremental or decremental value starting from a selected node number and wherein the assigned controlled nodes are connected to the same hybrid cable of the decentral access module (DAM).

15. The method according to claim 3 at least some of the steps are performed by a decentral access module (DAM) triggered by the programmable logic controller (PLC), wherein some or all controlled nodes are assigned a unique identifier as an incremental or decremental value starting from a selected node number and wherein the assigned controlled nodes are connected to the same hybrid cable of the decentral access module (DAM).

16. The method according to claim 4 at least some of the steps are performed by a decentral access module (DAM) triggered by the programmable logic controller (PLC), wherein some or all controlled nodes are assigned a unique identifier as an incremental or decremental value starting from a selected node number and wherein the assigned controlled nodes are connected to the same hybrid cable of the decentral access module (DAM).

17. The method according to claim 2, wherein setting the fieldbus network into a service mode comprises setting into service mode at least some or all of the controlled nodes automatically.

18. The method according to claim 3, wherein setting the fieldbus network into a service mode comprises setting into service mode at least some or all of the controlled nodes automatically.

19. The method according to claim 4, wherein setting the fieldbus network into a service mode comprises setting into service mode at least some or all of the controlled nodes automatically.

20. The method according to claim 5, wherein setting the fieldbus network into a service mode comprises setting into service mode at least some or all of the controlled nodes automatically.

* * * * *